United States Patent [19]
Garcia et al.

[11] Patent Number: 5,724,162
[45] Date of Patent: Mar. 3, 1998

[54] OPTICAL CORRELATOR USING SPATIAL LIGHT MODULATOR

[75] Inventors: Joseph P. Garcia, Greenbelt, Md.; Lisa Koenigsberg, Jerusalem, Israel

[73] Assignee: The United States of America as represented by the Secretary of the Navy, Washington, D.C.

[21] Appl. No.: 562,919

[22] Filed: Nov. 27, 1995

[51] Int. Cl.$^6$ .................................................. G02B 1/26
[52] U.S. Cl. ........................................ 359/22; 359/561
[58] Field of Search ............................. 359/560, 561, 359/10, 11, 22; 364/822, 827; 382/278, 279, 280

[56] References Cited

U.S. PATENT DOCUMENTS

| | | | |
|---|---|---|---|
| 3,600,594 | 8/1971 | Moore | 364/822 |
| 4,669,054 | 5/1987 | Schlunt et al. | 359/561 |
| 5,040,140 | 8/1991 | Horner | 364/822 |
| 5,307,306 | 4/1994 | Tournois et al. | 364/822 |

*Primary Examiner*—Jon W. Henry
*Attorney, Agent, or Firm*—James B. Bechtel, Esq.

[57] ABSTRACT

An optical correlator is disclosed that compares signals of interest against selected reference signals stored in holograms both of which are imaged onto a spatial light modulator comprising electron trapping material. The cooperative action of the light from the hologram and the light from a delayed line causes the spatial light modulator to produce signals that are proportional to the correspondence between the signals of interest and the reference signals.

8 Claims, 5 Drawing Sheets

OPTICAL CORRELATOR USING SPATIAL LIGHT MODULATOR

STATEMENT OF INTEREST

The invention described herein may be manufactured and used by or for the Government of the United States of America, for governmental purposes, without the payment of any royalty thereon or therefor.

CROSS REFERENCE TO RELATED U.S. PATENT APPLICATION

This application is related to U.S. patent application Ser. No. 08,562,920 filed Nov. 27, 1995 of J. Garcia, and assigned to the same assignee as the present invention.

BACKGROUND OF THE INVENTION

The present invention relates to a correlator and, more particularly, to an optical correlator having a spatial light modulator comprising electron trapping material that is optically arranged to cooperate with a hologram and input signals of interest that are compared against selectable reference signals stored in the hologram. The comparison produces output signals that are proportional to the correspondence between the input signals of interest and the stored reference signals.

Optical correlators can be found in electronic warfare (EW) receiver systems for signal detection applications involving signals that are encoded onto light carriers. The frequency of these signals is increasing as radar and communication technology continues to advance. The optical correlators are frequently implemented using spatial light modulator (SLM) technology that involves spatial data serving as reference data and representative of one or two dimensional matched filters. Current optical correlators serve well their intended purpose but are limited as far as their speed of response is concerned, especially their inability of handling very high frequency input signals of interest along with their inability to rapidly change reference signals to which the input signals of interest are compared. More particularly, current spatial light modulators permit about a few thousand changes of stored reference signals each second which is considered inadequate for certain EW receiver applications. It is desired that an optical correlator be provided that is capable of handling high frequency input signals of interest while at the same time also rapidly handling and changing stored reference signals so as to provide an optical correlator that may serve the needs of advanced EW systems.

SUMMARY OF THE INVENTION

The present invention is directed to an optical correlator employing spatial light modulator (SLM) technology but having means for improving the speed of response of the SLM so that the corresponding optical correlator may more efficiently serve the needs of optical communication systems.

The optical correlator comprises a delay line, a hologram, means for generating a steerable light excitation signal, a slab or film or pixelated array of electron trapping material, means arranged to receive and focus optical correlation signals developed by the electron trapping material, and means responsive to the focused beam to produce corresponding electrical signals. The delay line receives signals of interest comprising light modulated pulses spaced from each other with respect to time. The delay line has a plurality of stations each with means for providing illuminating pulses. The illuminating pulses between adjacent stations are spaced apart from each other with respect to time by a predetermined distance corresponding to the interpulse time of the light modulated pulses. The hologram has a plurality of predetermined locations each storing spatial data which produce predetermined optical reference signals when intercepted by a light having a predetermined direction and/or position. The hologram contains a library of reference signals each representing a signal from, for example, a known electronic warfare beam having a particular direction and/or position. A particular reference signal can be addressed by a light beam having a particular direction and/or position. More particularly, the reference signal can be addressed by a light beam having spatial coordinates defining a predetermined direction and position. The means for generating light focuses light on each of the plurality of predetermined locations and has an intensity which is controllable to produce the predetermined optical reference signals. The electron trapping structure has a plurality of locations in which a predetermined pattern whose contents are definable by a write beam and readable by a read beam. The predetermined pattern imaged onto the electron trapping material is arranged so as to be intercepted by the illuminating pulses representing an unknown signal of interest. Such an arrangement is implemented whereby the predetermined optical reference signal serves as the write beam and the illuminating pulses serve as the read beam. The predetermined pattern corresponds to an optical correlation reference signal when the content of the write beam is representative of the content of the read beam. The focus means is arranged to receive and focus, into one beam, the optical correlation signals. The means responsive to the focused beam produces electrical signals which are proportional to the correspondence between the unknown signal of interest and the optical reference signals.

Accordingly, it is an object of the present invention to provide an optical correlator utilizing electron trapping material responsive to optical signals developed from the interaction between holograms and delay lines in a manner so as to improve the overall speed of response of the optical correlator.

It is a further object of the present invention to provide various embodiments for the delay lines each of which cooperates with the electron trapping material to provide for an optical correlator having an improved speed of response.

Still further, it is an object of the present invention to provide for the electron trapping material having improved optical resolution.

Other objects, advantages and novel features of the invention will become apparent from the following detailed description when considered in conjunction with the accompanying drawings therein.

DETAILED DESCRIPTION OF THE PREFERRED EMBODIMENTS

Figure 1:
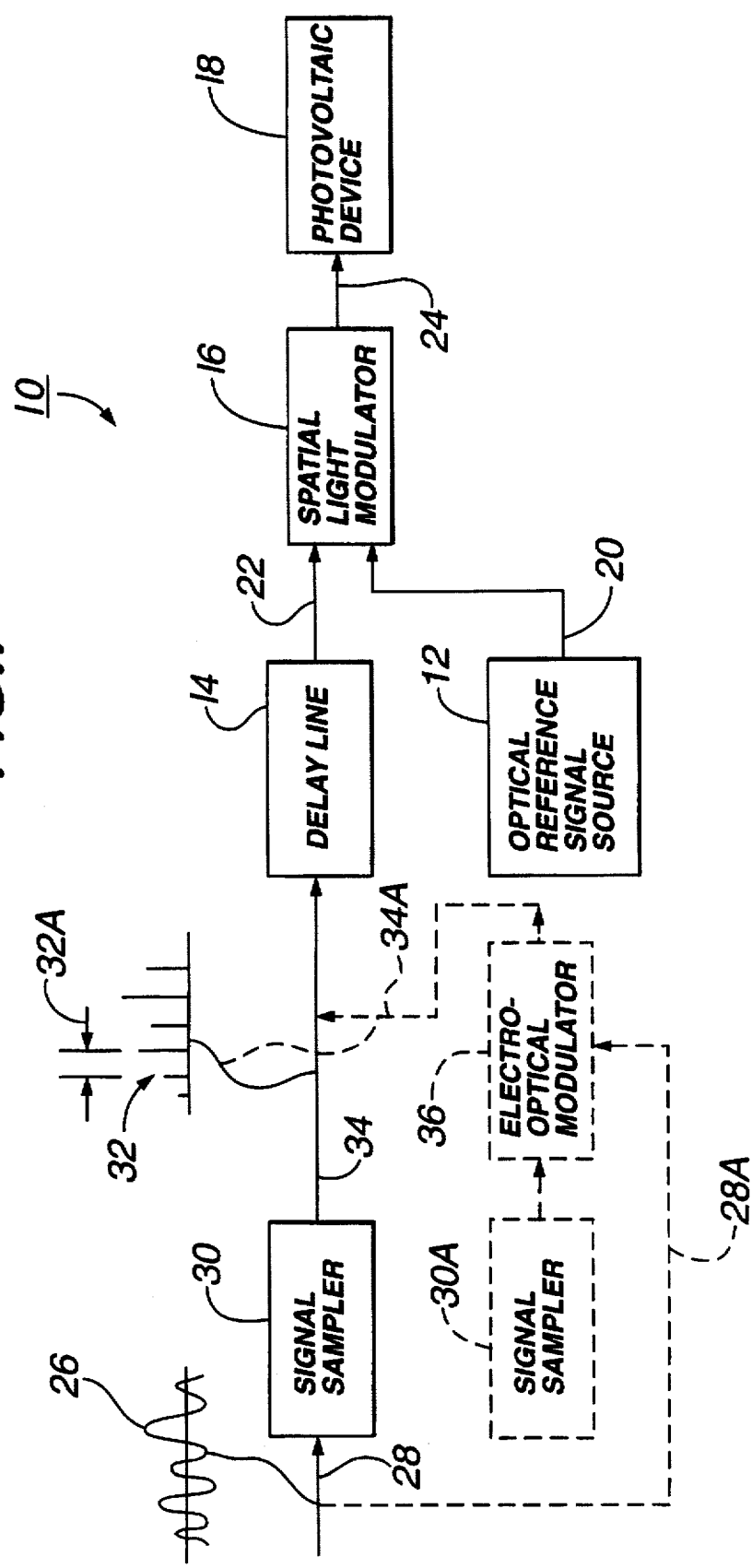
FIG. 1 is a block diagram of the present invention.

With reference to the drawings, wherein the same reference numbers indicate the same elements throughout, FIG. 1 illustrates a block diagram of the optical correlator 10 of the present invention. The optical correlator 10 comprises an optical reference signal source 12, a delay line 14, a spatial light modulator 16, and a photovoltaic device 18. The optical reference signal source 12 provides predetermined optical reference signals to the spatial light modulator 16 via optical path 20, whereas the delay line 14 provides illuminating pulses to the spatial light modulator 16 via optical path 22. The spatial light modulator 16 provides correlated optical signals to the photovoltaic device 18 via optical path 24.

In general, the optical correlator 10 compares unknown signals of interest 26 to be classified against selectable reference signals stored in holograms which are part of the optical reference signal source 12. The optical correlator 10 produces output signals that are proportional to the correspondence between the input signals of interest 26 and the reference signals stored in the holograms.

The input signals of interest 26 are of the RF type and are applied, via signal path 28, to a signal sampler 30 which may comprise a pulsed laser diode commonly found in fiber-optics communication networks. As is known in the art, the signals of interest 26 modulate the pulse amplitude of the laser diode so that the RF signal 26 is effectively sampled at discrete times and appears as an intensity pulse train optical signal 32 in which the pulses are separated from each other with respect to time by a predetermined distance, sometimes referred to herein as interpulse spacing, and shown in FIG. 1 by reference number 32A. The incoming signal of interest is band limited so that it complies with the Nyquist sampling criteria defined by the laser diode's pulse frequency. The signals of interest 26 are in the high frequency domain and are converted into a pulse train 32 of light pulses by the signal sampler 30 that represents the signals of interest according to the intensity of the pulses as varied over time. The pulse train optical signal 32 is applied to the delay line 14 via signal path 34. An alternative way of modulating the unknown signals of interest 26 with a CW laser is to route the signals of interest 26, via signal path 28A (shown in phantom), to an electro-optical modulator 36, shown in phantom as reference number The electro-optical modulator 36 provides for the pulse train optical signal 32 which is routed to delay line 14 of the optical correlator 10 via signal path 34A, shown in phantom. Further details of the optical correlator 10 may be further described with reference to FIG. 2.

Figure 2:
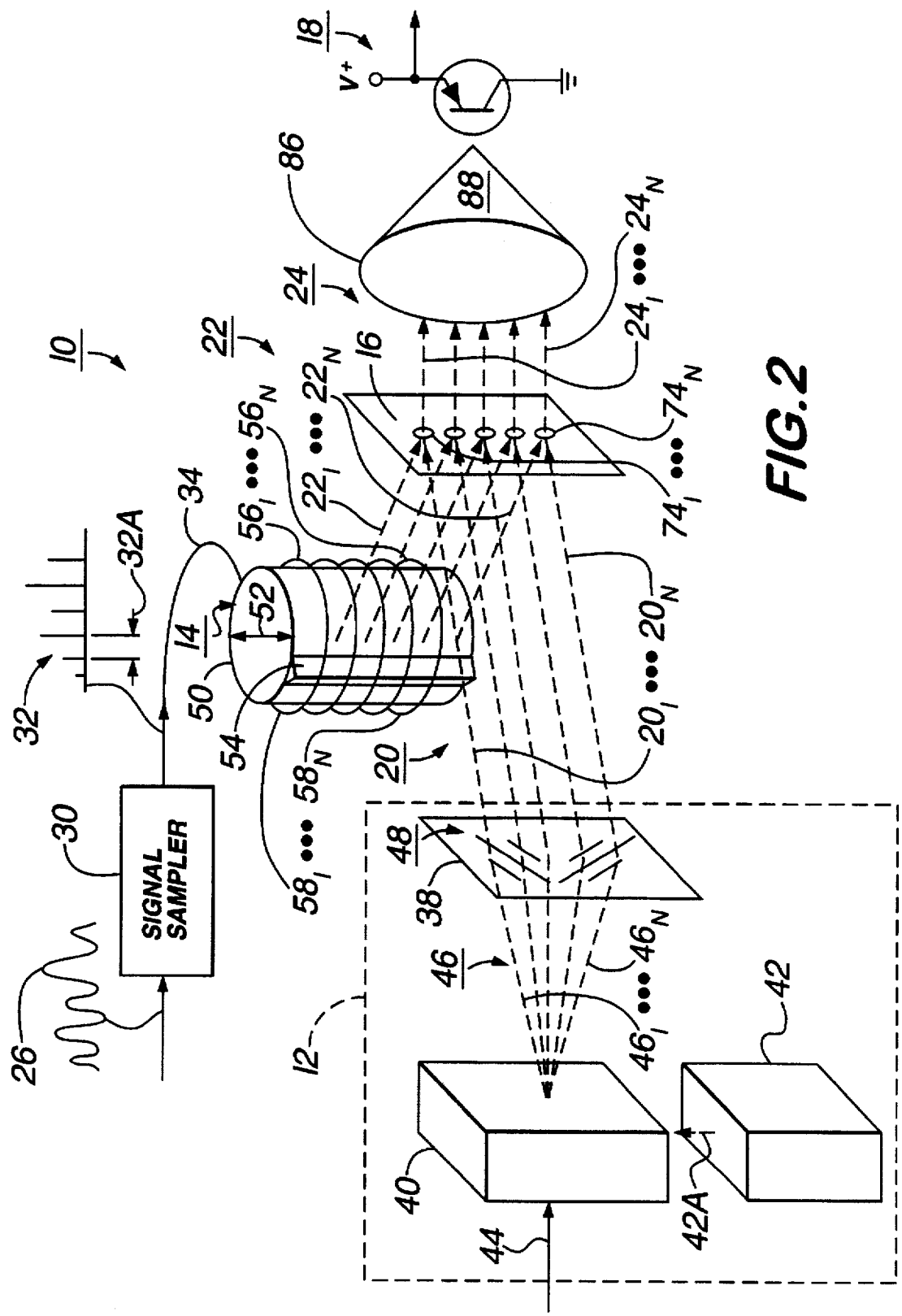
FIG. 2 is a schematic illustrating the interrelationships between the primary elements of the present invention.

FIG. 2 illustrates the optical reference signal source 12 as comprising a hologram 38, and a beam steerer 40 which is responsive to a control unit 42 via a control path 42A, shown in phantom. A laser beam 44 having a typical operating wavelength of 488 nanometers (nm) is applied to the beam steerer 40. The beam steerer 40 may be an acousto-optic Bragg cell or surface acoustic wave (SAW) device both responsive, in a manner known in the art, to an electrical signal applied on control line 42A by a control unit 42. The Bragg cell and surface acoustic wave device are both known in the art and need not be further described herein but, if desired, reference may be made to U.S. Pat. No. 5,173,790, herein incorporated by reference, for a more detailed discussion of the use of a Bragg cell. Still further, the hologram 38 is known in the art and a detailed description of its structure and operation is not necessary for an understanding of this invention; however, if desired, reference may be made to U.S. Pat. No. 5,172,251, herein incorporated by reference, for a more detailed discussion of the general principles of a hologram device.

The beam steerer 40 serves as a means for generating light excitation signals, shown by rays $46_1$, $46_2$, $46_3$, $46_4$ ... $46_N$ and comprising optical path 46 hereinafter referred to as beam 46, steerable to each of a plurality of predetermined locations on hologram 38 depicted as a plurality of stripes 48. The hologram 38 contains a library of reference signals each representing, for example, a signal from a known electronic warfare source. A particular reference signal can be addressed by a light beam having a particular direction and/or position. More particularly, the reference signal can be addressed by a light beam having spatial coordinates defining a predetermined direction and position. Each of the predetermined locations contains a reference signal having a predetermined direction and/or position. When the beam 46, having the spatial coordinates defining the predetermined direction and position corresponding to those of the reference signal, is focused on any particular location, via light rays $20_1$ ... $20_N$, a pattern of spots ($74_1$ ... $74_N$ of the spatial light modulator 16) on the far field (corresponding to the optical location and plane of the spatial light modulator 16), coincident with the light beam (comprising light rays $22_1$ ... $22_N$, hereinafter referred to as beam 22), is generated. The coincident light rays $22_1$ ... $22_N$ involved in the generation of the pattern of spots $74_1$ ... $74_N$ are created by the light emitted from the delay line 14. The intensity of the beam 46 controls the contents of the reference signals of the hologram 38 contained in the light rays $20_1$ ... $20_N$, hereinafter referred to as beam 20. As will be further described, the beam 20 serves as stored reference signals and the beam 22 serves as the unknown signals of interest and the correspondence therebetween is a measurement of correlation.

For the embodiment shown in FIG. 2, the delay line 14 comprises a cylindrical mandrel 50 having a predetermined diameter 52, a wedge 54, and a fiber optic cable 34 conducting the light modulation pulse signal 32 generated by signal sampler 30 or signal sampler 30A already described with reference to FIG. 1. The wedge 54 is affixed to mandrel 50 at a predetermined location and has one of its peaks, formed by two of its tapered sides, facing outward therefrom as depicted in FIG. 2. The fiber optic cable 34 has an outer covering, sometimes referred to as a cladding, which confines the light so that it remains within and is conveyed by the cable 34. However, the parameters of cable 34 are selected so that when the cable is bent, the covering allows light, represented by modulated pulse train 32, to be emitted from the bent portion.

The fiber optic cable 34 is wrapped around the mandrel 50 so as to provide a plurality of loops $56_1$, $56_2$, $56_3$, $56_4$, ... $56_N$, wherein the length of each loop, in cooperation with the selection of the diameter 52, is selected to serve as a delay line. More particularly, when light, such as one of the pulses of signal 32, is introduced into the entrance portion of any of the loops, such as loop $56_1$, it will be delayed by a predetermined time, preferably corresponding to distance 32A separating the pulses of signal 32, before it arrives at the exit portion of the same loop $56_1$. This delay (32A) is primarily determined by the length of the loop, such as loop 56, which, in turn, is determined by the predetermined diameter 52 of mandrel 50. The usage of the length of a light carrying device to establish a predetermined time delay is known in the art but, if desired, reference may be made to U.S. Pat. Nos. 3,596,104 and 4,164,373, both herein incorporated by reference, for further descriptions of the use of light carrying devices having built-in time delays.

Figure 3:
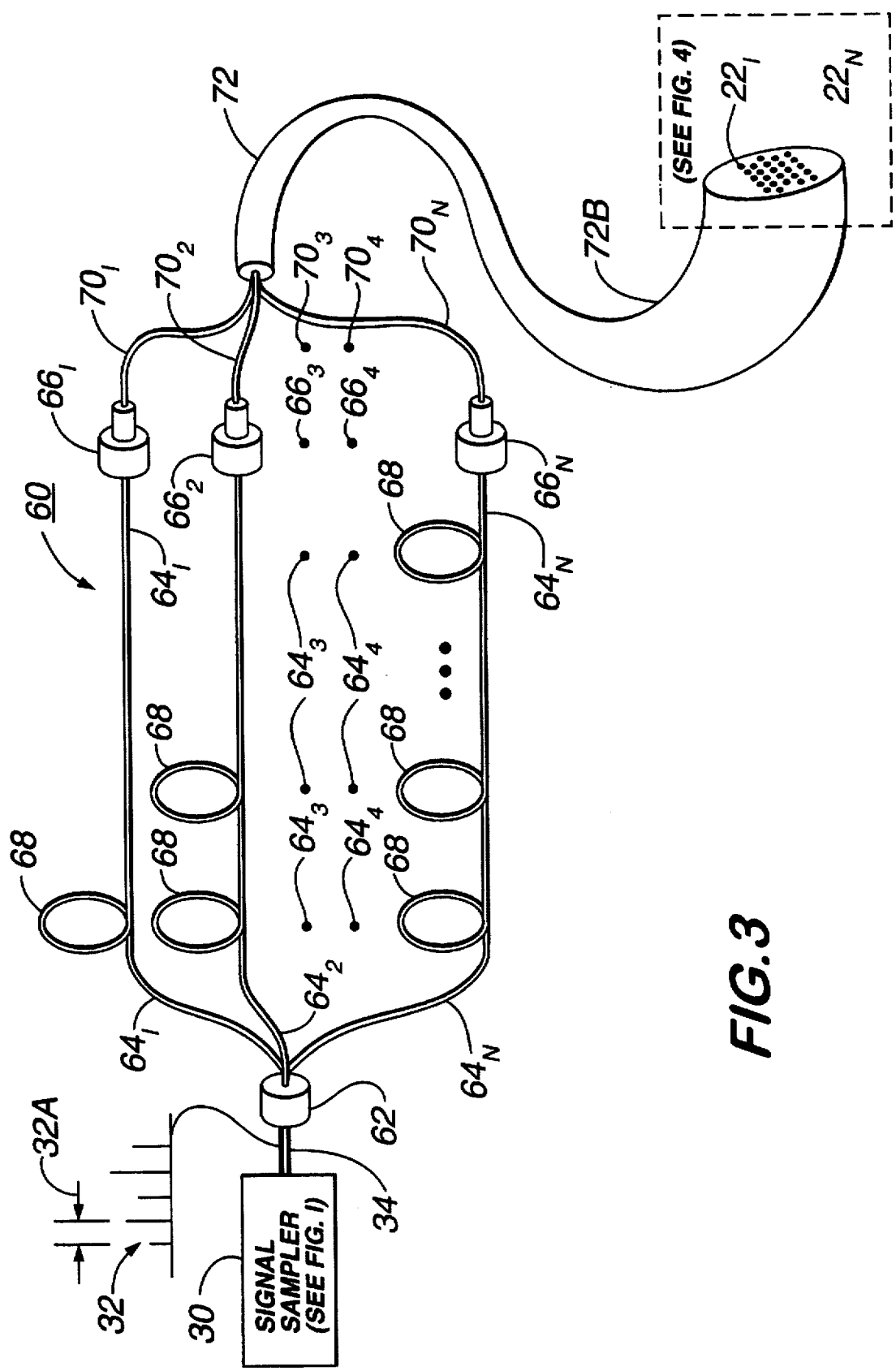
FIG. 3 is a schematic illustrating an alternate embodiment of a delay line that provides pulse illuminating signals delayed from each other, with respect to time, by a predetermined distance.

The optic cable 34 is wrapped around the mandrel 50 and the wedge 54 so that the wedge 54 introduces a small bend at a plurality of predetermined points $58_1, 58_2, 58_3, 58_4, \ldots 58_N$, serving as stations, and allowing some of the light to escape therefrom. The escaping light is imaged onto the plane of the spatial light modulator 16 and interacts with beam 20 in the formation of dots $74_1 \ldots 74_N$. More particularly, the stations $58_1, 58_2, 58_3, 58_4, \ldots 58_N$ respectively provide the pulsed illumination rays $22_1, 22_2, 22_3, 22_4, \ldots 22_N$ that respectively interact with light rays $20_1, 20_2, 20_3, 20_4 \ldots 20_N$. The adjacent stations of delay line 14, being separated by a loop having a predetermined length and thus a predetermined time delay preferably corresponding to 32A, provide illumination pulses that are separated from each other by the interpulse time 32A. More particularly, the stations $56_1, \ldots 56_N$ of delay line 14 respectively provide light rays $22_1, \ldots 22_N$ of delay line 14, forming beam 22. An alternative embodiment for providing the beam 22 may be described with first reference to FIG. 3 illustrating an arrangement 60.

The arrangement 60 comprises a star coupler 62, known in the art, that receives the pulse train optical signal 32 and directs substantially equal portions into the entrance portion of each of a plurality of optical fibers $64_1, 64_2, 64_3, 64_4 \ldots 64_N$, each having an exit portion respectively connected to fiber optic connectors $66_1, 66_2, 66_3, 66_4 \ldots 66_N$ also known in the art. The plurality of optical fibers $64_1 \ldots 64_N$ each has at least one loop 68. More particularly, the first optical fiber $64_1$ has one loop 68, whereas the remaining fibers $64_2, 64_3, 64_4 \ldots 64_N$ have a sequentially increasing number of loops 68 as shown in FIG. 3.

As previously discussed with reference to loops $56_1 \ldots 56_N$, each of the loops 68 has a predetermined length so that the time difference between an illuminating pulse entering and exiting a respective loop is equal to the distance 32A separating the pulses of the signal 32. For such an arrangement, the signal entering the loop 68 of the fiber optic cable $64_1$ will be delayed by one pulse separation, whereas the same signal entering the loops 68 of the second optical fiber cable $64_2$ will be delayed in time by an amount equal to twice the time separation 32A, and so on. The overall effect is that the plurality of optical fibers $64_1 \ldots 64_N$ serves in the same manner as the previously described stations $58_1 \ldots 58_N$. More particularly, the illumination pulses carried by the fiber optics $64_1, 64_2, 64_3, 64_4 \ldots 64_N$ are directed to respectively enter optical fibers $70_1, 70_2, 70_3, 70_4 \ldots 70_N$ that are carried by a composite cable 72 having an end 72B with an exposed face. The illumination pulses carried by fiber optics $64_1 \ldots 64_N$ are respectively launched out of the end 72B of cable 72 as light rays $22_1 \ldots 22_N$ comprising beam 22. The launched light rays $22_1 \ldots 22_N$, having a typical operating wavelength of 1300 nm, may be further described with reference to FIG. 4.

Figure 4:
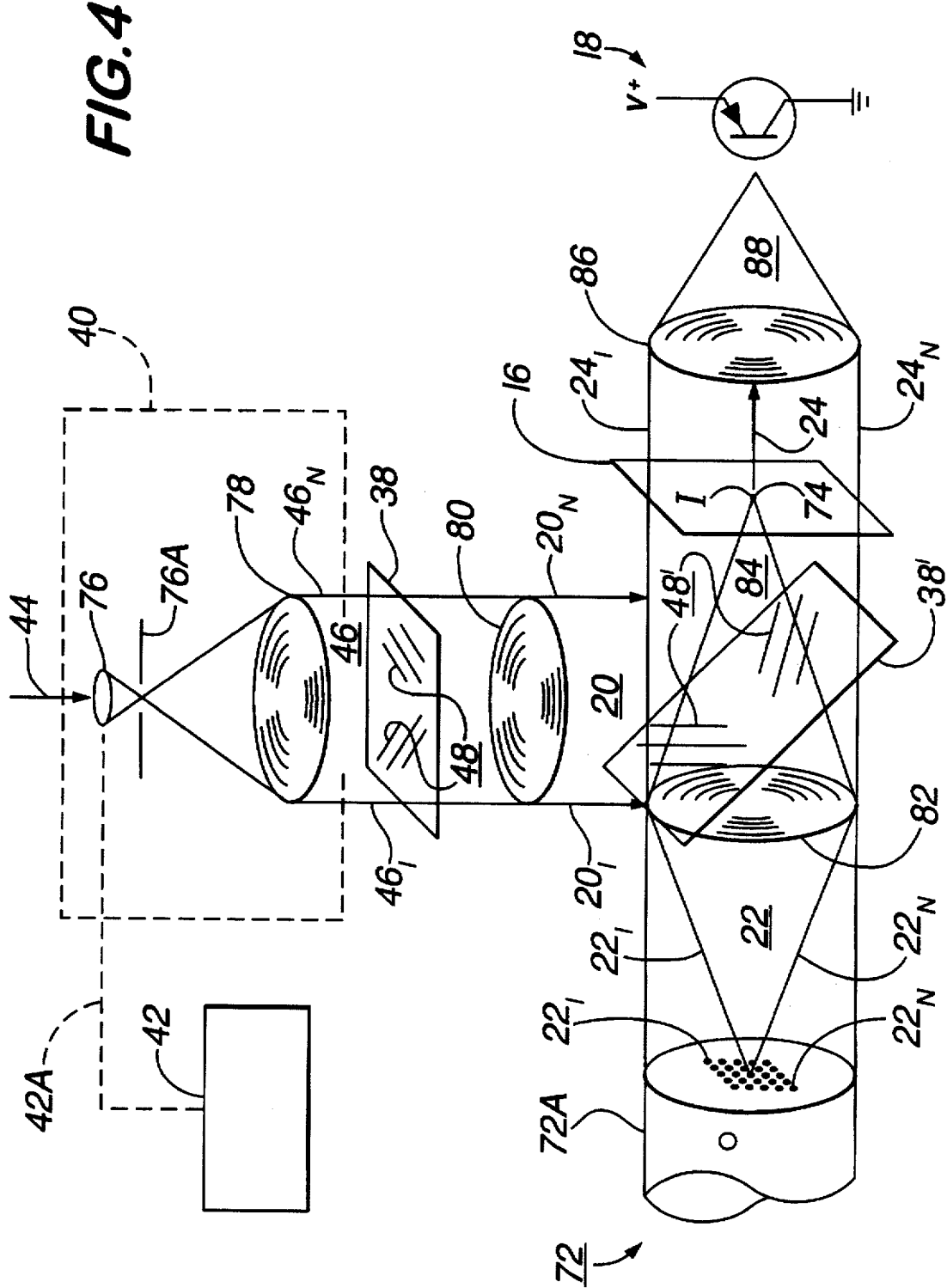
FIG. 4 is related to FIG. 3 and schematically illustrates the superimposition of the illuminating pulses onto the optical reference signals all of which cooperate with each other to produce the spots of the electron trapping material developing light rays that emanated therefrom as correlation signals.

In general, FIG. 4 illustrates the interaction between the beam 22 representing the signals of interest 26 and the beam 20 representing the stored reference signals derived from the spatial data stored in predetermined locations of the hologram 38. More particularly, the beam 46, comprised of light rays $46_1 \ldots 46_N$, as described with reference to FIG. 1, being focused on a predetermined location 48 of the hologram 38, forms the beam 20 (comprised of light rays $20_1 \ldots 20_N$) that is optically directed, as shown in FIG. 4, onto the spatial light modulator 16. Concurrently, the beam 22, comprised of light rays $22_1 \ldots 22_N$, is launched from the end 72A of cable 72 and converge at their far end or field, relative to end 72A, onto the spatial light modulator 16 and are respectively in coincidence with light rays $20_1 \ldots 20_N$. Both beams 20 and 22 cooperate to form spots $74_1 \ldots 74_N$ on the spatial light modulator 16.

The beam steerer 40, generally illustrated in FIG. 4, produces the beam 46, generally described with reference to FIG. 2. The beam steerer 40 is responsive to the control signal generated by the control unit 42 and present on the control path 42A. The beam steerer 40 comprises a lens 76 that receives the laser signal 44 and directs and focuses laser signal 44 through an aperture 76A allowing it to expand onto and spread over a lens 78 which, in turn, focuses the beam 46, comprised of rays $46_1 \ldots 46_N$, onto the hologram 38, more particularly, onto the plurality of predetermined locations 48 which produce, in a manner as described with reference to FIG. 2, predetermined optical reference signals when intercepted by light having a corresponding intensity. The optical reference signals yielded by the hologram 38 are optically directed to a lens 80 which, in turn, produces the beam 20.

The optical coaction between the elements 76, 76A, 78 and 80 causes the image 38' of the hologram 38, as well as the image 48' of the optical contents 48 of the hologram 38, to be superimposed onto the optical path of the beam 22. The optical path of the beam 22 includes a lens 82 positioned at the center of the focal length thereof. The lens 82 receives the beam 22 and develops an output beam 84. The optical path is generally illustrated as having its object (O) (at the end 72A) and its image (I) located on the spatial light modulator 16, in particular, at the spot 74 thereof. The image 48' of the contents 48 of the hologram 38 is superimposed onto the information contained in the illuminated pulse beam 22 so that the overall information contained in both the beams 20 and 22 are in coincidence with each other and develop the one or more spots 74 of the spatial light modulator 16 which, in turn, develops the rays $24_1, \ldots 24_N$ comprising beam 24 that is directed onto a lens 86 which, in turn, merges the rays $24_1 \ldots 24_N$ into one beam 88 that is focused onto the photovoltaic device 18, arranged in a conventional manner. The photovoltaic device 18 produces electrical output signals which are proportional to the correspondence between the beams 20 and 22. The spatial light modulator 16 may be further described with reference back to FIG. 2.

As generally illustrated in FIG. 2, the spots $74_1, 74_2, 74_3, 74_4 \ldots 74_N$ are formed by the merging or coincidence between the light rays $22_1, 22_2, 22_3, 22_4 \ldots 22_N$ and the light rays $20_1, 20_2, 20_3, 20_4 \ldots 20_N$. The spots $74_1 \ldots 74_N$ are formed by the operation of the spatial light modulator 16 and correspondingly produce correlation signal $24_1 \ldots 24_N$ that are merged into beam 88 by lens 86. The spatial light modulator 16 comprises an electron trapping material formed of a phosphorescence material. The beam 20 serves as a write beam, whereas the beam 22 serves as a read beam both being related to the electron trapping material. The electron trapping (ET) material is known in the art and details of its structure and operation may be found in the technical articles entitled "Use of Electron Trapping Materials in Optical Signal Processing," of S. Jutamulia et al. published in *Applied Optics*, Vol. 20, No. 20, Jul. 10, 1991 and "Charge Trapping and Mechanism of Stimulated Luminescence in CaS: Ce, Sm" of K. Chakrabarti et al. published in *Journal of Applied Physics*, Vol. 65, No. 5, Mar. 1, 1989.

In general, the slab, film or pixelated array of electron trapping material has a plurality of locations in which a predetermined pattern representing a correlation reference signal can be applied by the write beam and read by the read beam. The predetermined patterns imaged onto electron trapping material structure are arranged so as to be intercepted by both the predetermined reference optical signals (beam 20) and the illuminating pulses (beam 22) so that the beam 20 serves as the write beam and beam 22 serves as the read beam. Corresponding optical correlation signals ($24_1 \ldots 24_N$) are provided when the contents of the write beam is the contrast reversed image of the contents of the read beam. The term "contrast reversed" is in the sense of a photographic negative, which as known, has light and dark parts in inverse order to those of the original photographic subject. The degree of difference between the lightest and darkest parts of the pictures is the contrast of the photographic subject. With regard to write and read beams of the present invention, optical correlation signals ($24_1 \ldots 24_N$) are provided, when the contents of the write beam, for example, represents a light image while correspondingly the contents of the read beam represents a dark image.

The electron trapping material comprising the spatial light modulator 16 is of a nature in which one wavelength of light controls the transmissivity of another wavelength of light as more fully described in the aforementioned technical articles of S. Jutamulia et al and K. Chakrabartic et al. As mentioned above, the beam 20 being launched from the hologram 38 is the write beam, while the beam 22 being launched from the delay line 14 or arrangement 60 is the read beam.

The controllability of the write beam is a result of the multiphoton phosphorescence property of the electron trapping material. More particularly, a given location of the electron trapping material absorbs a photon of the write beam 20 in which the photon's energy causes a nearby freely drifting electron to be confined or "trapped" at that point. The locations containing the trapped electrons are now strongly absorbing with respect to the photons of the read beam's 22 wavelength. The absorbency of a given area of electron trapping material is a function of the number of trapped electrons in that area which, in turn, is a function of the intensity of the write beam 20. If the write beam 20 contains a light pattern that corresponds to the contrast reversed image of the light pattern of the read beam 22, the image of the read beam 22 will have a high throughput through the electron trapping material forming the spatial light modulator 16. The method of the present invention is distinct from the approach used for a spatial light rebroadcaster that utilizes the phosphorescence light as more fully described in the technical article entitled "Optical Heteroassociative Memory Using Spatial Light Broadcasters," of A. D. McAulay et al, published in *Applied Optics*, Vol. 29, 1990.

In operation, the optical correlator 10 serves as a two dimensional matched filter. The optical correlator 10 utilizing a hologram 38 that can store a large number of reference signals, allows for the implementation of a relatively fast beam steering device, such as the Bragg cell 40, so as to enable rapid scanning of the hologram 38 over a large number of reference patterns 48 in a relatively short time. The superposition of the reference patterns, discussed with reference to FIG. 4, are possible such that a family of reference signals (beam 20) can be composed from a basic set of reference locations. In other words an ortho-normal set of reference signals can form an admissible basis representing the signal of interest. The overall operation of the electron trapping material provides for the generation of the plurality of image information represented by spots $74_1 \ldots 74_N$ which are transmitted to the focusing lens 86 via light rays $24_1 \ldots 24_N$. The rays $24_1 \ldots 24_N$ represent the correspondence between the reference signals (beam 20) and the signals of interest (beam 22). The lens 86 focuses the light passing through the electron trapping material comprising the spatial light modulator 16 onto the high speed photodetector (device 18) and constitutes the detection of a particular input signal 26 manifested by an electrical output signal and which is in correspondence with the reference signal formed by the predetermined pattern 48 located in the hologram 38.

It should now be appreciated that the practice of the present invention provides for a spatial light modulator 16 comprising electron trapping material that implements and provides for a relatively fast speed of response for the optical correlator 10. More particularly, the optical correlator 10 may handle signals of interest represented by the pulse train 32 having a typical operating wavelength of 1300 nm, while at the same time accommodate the ability to change the reference signals stored on the hologram by the beam steerer 40 responsive to a laser signal having a typical operating wavelength of 488 nm.

It should be further appreciated that the practice of the present invention provides for a delay line forming an essential element of the optical correlator 10 and having various embodiments such as those disclosed with reference to FIGS. 2, 3 and 4.

The electron trapping material used to implement the spatial light modulator 16 is typically made available as a thin film device. The thin film electron trapping material has a limitation with regard to its usage in optical applications because it is a highly scattering material. The scattering determines the resolution by defining the minimum spot size. The scattering increases with the thickness of the electron trapping material. Since the modulation is proportion to the thickness of the film, there is a trade off on the spot size ($74_1 \ldots 74_N$) that might be developed and the modulation of the electron trapping material that might be selected. The term "modulation" refers to the degree the read beam is attenuated by the electron trapping material under the influence of the write beam. Therefore, high modulation must be traded-off against high resolution (small spot size) and vice-versa. One way to improve modulation, while maintaining high resolution, is to "pixelate" the substrate and which may be further described with reference to FIG. 5.

Figure 5:
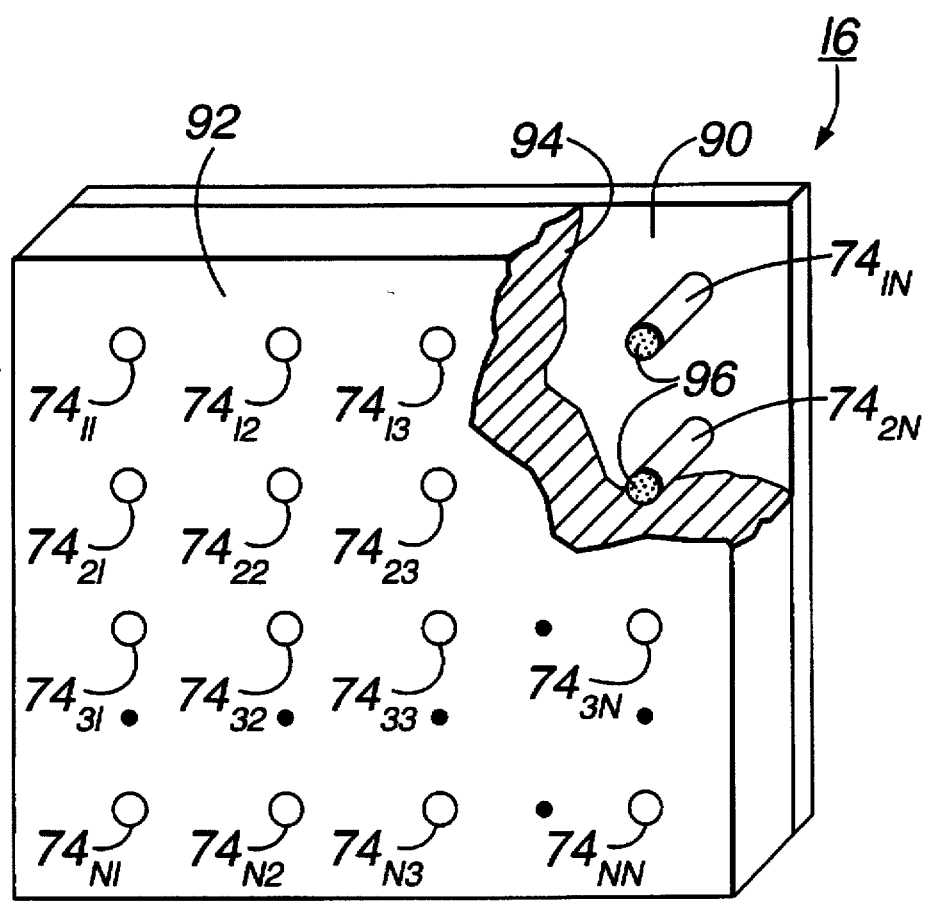
FIG. 5 illustrates a pixelated array of electron trapping material having improved optical resolution relative to a continuous film or slab of electron trapping material.

FIG. 5 illustrates a plurality of pixels representative of the spots $74_1 \ldots 74_N$ and arranged in a matrix array $74_{NN}$ as partially shown in FIG. 5. More particularly, FIG. 5 illustrates the matrix array $74_{11} \ldots 74_{NN}$ in two different sections 90 and 92, wherein section 90 indicates pixels $74_{1N}$ and $74_{2N}$ as being devoid of any intervening material therebetween, whereas section 92 indicates the remaining pixels as separated by an opaque material 94. The section 90 illustrates that a standard photolithographic technique was first used to remove all the intervening electron trapping material between pixels $74_{11} \ldots 74_{NN}$ and then the opaque material 94 was used to fill in the intervening space as shown for section 92. The opaque material 94 optically isolates one pixel from another.

A further way to improve the optical characteristics of the electron trapping material is to coat the exteriors of the pixels $74_{11} \ldots 74_{NN}$ with a reflective material 96, as shown with reference to section 90. Further, the coating of the reflective material may be placed along the interface of the electron trapping material and the opaque isolating material. Furthermore, the reflective material may be placed any point along the surface of the electron trapping material that desires reflection therefrom. For example, the reflective material may be placed on the end wall opposite the front face of the pixel $74_{1N}$, shown in FIG. 5 as having reflective material 96 thereon, so that a light ray entering pixel $74_{1N}$ (reflective material 96 now removed) is reflected off the end wall of pixel $74_{1N}$ and directed back along its entering path. The reflector material 96 causes each pixel $74_{11} \ldots 74_{NN}$ to act as a stand-alone integrating sphere.

It should now be appreciated that the practice of the present invention provides for an improvement to the use of a typical electron trapping material to improve its optical capabilities and thus, the optical capabilities of the optical correlator 10 in which it is utilized.

Many modifications or variations of the present invention are possible in view of the above disclosure. It is, therefore, to be understood, that within the scope of the appended claims, the invention may be practiced otherwise as specifically described.

What we claim is:

1. An optical correlator comprising:

(a) a delay line for receiving signals of interest comprising light modulated pulses spaced apart from each other with respect to time so as to represent interpulse time, said delay line having a plurality of stations with means for providing illuminating pulses between adjacent stations that are spaced apart from each other by a predetermined interpulse time;

(b) a hologram having a plurality of locations each storing spatial data which produce predetermined optical reference signals when intercepted by light beams having spatial coordinates defining a predetermined direction and position;

(c) means for generating a light excitation signal steerable to each of said plurality of locations and having said spatial coordinates defining said predetermined direction and position to produce said predetermined optical reference signals;

(d) an electron trapping material with a defined plane and having a plurality of locations with each location being representative of a predetermined pattern whose contents is definable by a write beam and readable by a read beam, said predetermined pattern being imaged onto said electron trapping material representing a correlation reference signal and is arranged so as to be intercepted by said illuminating pulses representing some unknown input signal to be classified, and so that said predetermined optical reference output signals serve as said write beam and said illuminating pulses serve as said read beam, said predetermined pattern of said electron trapping material providing corresponding optical correlation signals when the contents of said write beam is the contrast reversed image of the contents of said write beam;

(e) focus means arranged to receive and focus into one beam said optical correlation signals; and (f) means responsive to said focused beam to produce electrical signals which are proportional to the correspondence between said signals of interest and said predetermined optical reference signals.

2. The optical correlator according to claim 1, wherein means for generating a light excitation signal steerable to said hologram is selected from one of a Bragg cell unit and surface acoustic wave device each responsive to an electrical control signal.

3. The optical correlator according to claim 1, wherein said light modulated pulses are generated by a laser responsive to an alternating current signal whose frequency corresponds to said interpulse time.

4. The optical correlator according to claim 1, wherein each of said plurality of predetermined optical reference output signals stores a family of patterns to which the correlation of said signals of interest is measured.

5. The optical correlator according to claim 1, wherein said delay line comprises:

(a) a cylindrical mandrel having a predetermined diameter;

(b) a wedge affixed to the mandrel at a predetermined location thereon and having one of its peaks formed by its tapered sides facing outward therefrom;

(c) a fiber optic cable having an outer covering confining light to remain inside said cable except when being bent thereby allowing light to be emitted from the bent portion, said fiber optic cable conveying said light modulated pulses and being wrapped around said mandrel, said fiber optic cable being bent outward by coming into contact with said peak and forming said stations and causing light to exit from said cable at said bend, said exiting light comprising said read beam and arranged so as to be imaged onto the plane of said electron trapping material, each of the wraps of said fiber optic cable about said mandrel forming a loop having a predetermined length which is selected so that light rays emitted from adjacent stations are spaced apart from each other by said predetermined interpulse time.

6. The optical correlator according to claim 1, wherein said predetermined patterns of said electron trapping material comprise pixels that are optically isolated from one another.

7. The optical correlator according to claim 6, wherein said pixels have a coating formed of a reflective material along the interface of an electron trapping material and the opaque isolating material.

8. The optical correlator according to claim 6, wherein said pixels have a coating formed of reflective material on any point along the surface of the electron trapping material that desires reflection therefrom.

* * * * *